United States Patent

[11] 3,612,584

[72] Inventor Philip W. Taylor
 Howell, Mich.
[21] Appl. No. 866,899
[22] Filed Oct. 16, 1969
[45] Patented Oct. 12, 1971
[73] Assignee Taylor Industries Inc.

[54] TEMPERATURE COMPENSATED FLUID COUPLING
 7 Claims, 3 Drawing Figs.
[52] U.S. Cl. ................................................ 285/174,
 285/187, 285/423, 285/DIG. 6
[51] Int. Cl. ...................................................... F16l 55/00
[50] Field of Search .......................................... 285/187,
 355, 174, 251, 340, 258, 423, 239, 238, 149, DIG.
 6, 381; 138/133, 153

[56] References Cited
UNITED STATES PATENTS
1,343,967 6/1920 Gilson ............................. 285/149 X
1,825,769 10/1931 Barborou ......................... 285/381 X
2,878,040 3/1959 Hobbs ............................. 285/187 X
3,348,862 10/1967 Leopold et al. ................. 285/174 X
3,507,522 4/1970 Froman et al. .................. 285/187
3,524,661 8/1970 Farnam ........................... 285/259 X Primary Examiner—Dave W. Arola
Attorney—Hauke, Gifford and Patalidis ABSTRACT: A temperature compensated fluid coupling for connecting two pipes and having a plastic male connector adapted for connection within a metalic female connector. The female connector has a longitudinal threaded bore which is engaged by a threaded peripheral surface of the male connector to form a fluidtight seal therebetween. The male connector has a longitudinal bore opening into the female bore to permit the flow of fluid between the two pipes, and is provided with a helicoidal spring exerting a force against the surface of the male bore to urge the same outwardly, thereby expanding the outer peripheral threaded surface thereof to maintain a fluidtight engagement with the female threads when the female and male connectors separate diametrically when subjected to temperature change.

PATENTED OCT 12 1971

3,612,584

INVENTOR

PHILIP W. TAYLOR

BY Hauke, Gifford & Patalidis

ATTORNEYS 3,612,584

TEMPERATURE COMPENSATED FLUID COUPLING

Background of the Invention

1. Field of the Invention

The present invention relates to fluid coupling devices and more particularly to a temperature compensated fluid coupling device having female and male threaded connectors which engage in a fluidtight relationship.

2. Description of the Prior Art

Heretofore, fluid couplings have consisted of a pair of mating metallic connectors generally of the female-male type in which the female connector is provided with a longitudinal bore having a portion thereof threaded and adapted to receive in a locking engagement a mating threaded surface formed on the outer periphery of the male connector. The male connector has a longitudinal bore which opens into the female bore to establish fluid communication between suitable piping carried at the opposite ends of the connectors. A gasket may be provided between the juncture of the connectors if high-pressure operation is desired, however, the engaging threaded surfaces of the connectors usually provide a sufficient fluidtight seal over a large operating range of pressures and temperatures. Since the male-female connectors are made of the same material, generally steel, copper or bronze, there is usually no leakage between the threaded surfaces with increased temperatures as the two connectors will expand diametrically outward at the same rate, thus maintaining the desired fluidtight seal.

In recent years the use of plastics has come into greater use in the manufacture of such connectors and often a coupling device utilizing a metallic female connector and a plastic male connector is employed in applications wherein the temperature of the fluid is increased and decreased.

Since the plastic connector has a coefficient of expansion which substantially exceeds the coefficient of expansion of the metallic connector the plastic connector expands more than the metallic connector which surrounds it and is therefore subjected to stress due to being restrained by the metallic connector. When the plastic material is put under stress for any period of time the plastic material exhibits a property known as "creep," which is a tendency of the plastic to flow and attempt to relieve the stress. The plastic male connector tends to expand more than the metal of the female connector which surrounds it and is restrained by the metal. Thus at a later time when the fluid coupling is cooled the plastic connector contracts more than the metal connector causing the threaded surfaces of the connectors to separate and break the fluidtight seal therebetween, resulting in a leakage of fluid from the coupling.

It would therefore be desirable to provide a fluid coupling device of the type described having a metallic female connector and a plastic male connector and means for maintaining a fluidtight seal as the coupling is subjected to a decrease in temperature or to an increase in temperature followed by a decrease in temperature.

Summary of the Invention

The present invention, which will be described in greater detail hereinafter, is a temperature compensated fluid coupling having a metallic female connector and a plastic male connector adapted for connection within the female connector to establish a fluid coupling, the male connector having a longitudinal bore extending therethrough to permit the passage of fluid into the female connector. A helicoidal spring positioned within the longitudinal bore of the plastic male connector exerts a force against the surface of the bore to urge the plastic male connector to expand outwardly to engage the metallic female connector in a fluidtight relationship for preventing the threads of the metallic female connector from seperating from the threads of the plastic male connector when subjected to temperature changes.

Brief Description of the Drawings

The several objects, advantages and applications of the present invention will become apparent to those skilled in the art when the accompanying description of two examples of the best mode contemplated for practicing the invention is read in conjunction with the accompanying drawings wherein like reference numerals refer to like parts, and in which.

Description of the Preferred Embodiments

Figure 1:
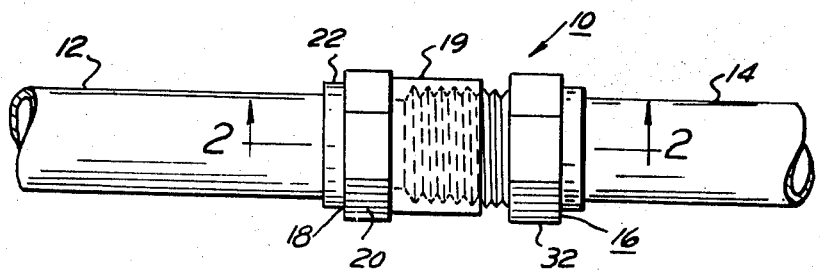
FIG. 1 is a longitudinal view of one example of a fluid coupling device incorporating the present invention and of portions of two pipes which are connected end to end by the coupling.
Figure 2:
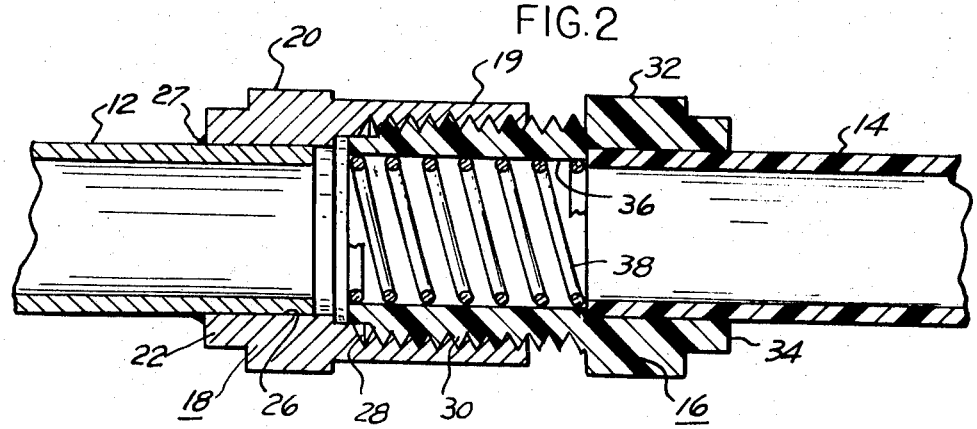
FIg. 2 is an enlarged longitudinal section of the fluid coupling device illustrated in FIG. 1 and take along line 2-2 thereof.

Referring to the drawing, and particularly to FIGS. 1 and 2, there is shown a fluid coupling device 10 for connecting two pipes 12 and 14 in an end to end relationship. The fluid coupling 10 is comprised of a plastic male connector 16 adapted for connection within a metallic female connector 18.

The female connector 18 is comprised of a cylindrical body 19 having a hexagonally shaped outer end portion 20 adapted to be engaged by a tool such as a wrench to permit tightening of the coupling device 10. A collar 22, also formed integrally with the cylindrical body 19, extends outwardly therefrom and is adapted to receive the pipe 12 within a longitudinal bore 26 formed within the female connector 18. The pipe 12 is secured to the female connector 18 by applying a solder between the peripheral surfaces of the pipe 12 and bore 26 as indicated at 27. Optionally, the pipe 12 may be threaded into the bore 26. The bore 26 extends from opposite ends of the female connector and is provided with a threaded portion 28 which is adapted to receive in a locking engagement a correspondingly threaded portion 30 formed on the outer peripheral surface of the male connector 16.

The plastic male connector 16 is also of a generally cylindrical shape having a hexagonally shaped end portion 32 adapted to receive a tightening tool such as a wrench. A collar 34, formed integrally with the male connector 16, extends outwardly therefrom and is adapted to receive the pipe 14 within a longitudinal bore 36 which extends from opposite ends of the male connector 16. The pipe 14 is secured to the male connector bore 36 by applying a suitable adhesive between the peripheral surface of the pipe 14 and the engaged portion of the bore 36. The adhesive forms a bond between the bore 36 and pipe 14 to provide a seal and prevent separation during use. The longitudinal bore 36 provides communication from the interior of the pipe 12, thus when the male connector 16 is threaded into the female connector 18 a fluid coupling is established between the pipe 12 and the pipe 14. The threaded portion 30 of the male connector 16 is tapered so as to insure a fluidtight seal upon insertion with the threaded portion 28 of the female connector 18. The threaded portion 28 of the female connector may optionally be provided with an opposite taper.

A helicoidal spring 38 is disposed within the male connector bore 36. The spring 38 is precompressed prior to being disposed within the bore 36 such that it tends to expand outwardly against the interior surface of the bore 36 to provide a force urging the thread portion 30 of the male connector 16 in an outwardly expanding direction.

It is well known that the coefficient of expansion of a metal, such as steel, copper, bronze, stainless steel and the like which may be utilized in the manufacture of the female connector 18, is substantially less than the coefficient of expansion of the plastic materials which are utilized in the construction of the male connector 16. Thus, when heated fluid is first directed through the fluid coupling device 10 or the temperature of the fluid passing therethrough is rapidly increased, the plastic male connector 16 expands outwardly at a greater rate than the outwardly expansion of the metallic female connector 18. If the temperature of the fluid initially entering the fluid coupling or if the temperature increase of fluid passing therethrough is rapid the plastic expands at a substantially greater rate than the metal of the female connector 18.

Since the natural tendency of the plastic male connector 16 to expand is restrained by the metallic female connector 18, the male connector is subjected to stress. When plastic is so stressed it exhibits a property known as "creep" which is a deformation with time under a constant load. When the plastic material is put under stress for any period of time, the plastic material will flow and attempt to relieve the stress. Because the material is under stress and tends to "creep," the tendency is to relieve the stress and thus upon cooling at a later time the plastic male connector 16 contracts more than the metallic connector causing the threaded portion 28 of the female connector 18 to disengage the threaded portion 30 of the male connector 16 a sufficient distance to permit the passage of fluid therebetween and thus cause a leakage of the fluid externally to the coupling device 10. Such fluid leakage from the coupling device 10 is obviously very undesirable.

To insure that a fluidtight seal between the threaded portions of the male and female connectors is maintained when the two connectors tend to separate due to a temperature decrease, the spring 38 exerts a radial outwardly directed force against the inner surface of the male connector bore 36 such as to urge the outer peripheral surface, and thus the threaded portion 30 formed thereon outwardly so as to maintain engagement with the threaded portion 28 formed on the inner surface of the female bore 26 when the male connector tends to contract at a faster rate than the female connector.

Figure 3:
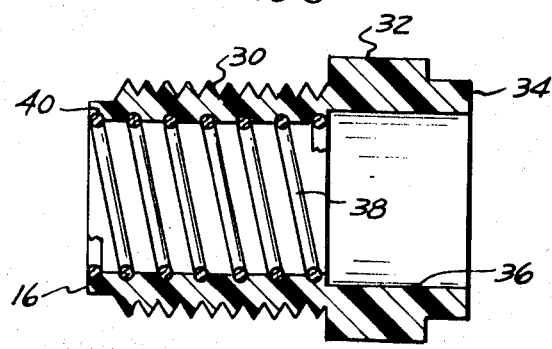
FIG. 3 is an enlarged sectional view of another example of a plastic male connector incorporating the present invention.

Referring to FIG. 3, there is shown another example of a plastic male connector 16 having a spiral shaped receiving groove 40 formed along the wall of the longitudinal bore 36. The receiving grove 40 is sized to receive a portion of each of the coils of the spring 38 so as to securely maintain the same within the bore 36. Preferably, the receiving groove 40 is formed on the bore wall and the spring 38 is threaded therein. The embodiments disclosed in FIGS. 2 and 3 function in the same manner.

The dimensions of the spring 38, the size of the threads formed on the peripheral surfaces of the male and female connectors, and the diametrical thickness of the male and female connectors are such that when the spring 38 is inserted within the male connector bore 36, the precompressed coils of the spring 38 exert a radially outward directed force against the inner surface of the male connector bore 36 to urge the male connector 16 to expand outwardly such that the threaded portion 30 thereon is maintained in a fluidtight engagement with the female connector threaded portion 28 as the fluid coupling 10 contracts diametrically when cooled. The outwardly directed force of the spring 38 against the wall of the male connector bore 36 securely maintains the spring in a fixed position in the embodiment disclosed in FIG. 2, preventing even fluid circulating at high velocity and pressure through the coupling device 10 from carrying the spring 40 into the pipe 14 or 12. The receiving groove 40, illustrated in the embodiment disclosed in FIG. 3, provides a comparable function.

It should be further noted that since the spring 38 is of a metallic material, such as steel, copper, bronze, stainless steel or the like its outward expansion is a function of both its precompression when inserted with the male connector bore and the amount of expansion thereof when subjected to a temperature change.

Having described the invention, what is claimed is as follows:

1. A temperature compensated fluid coupling comprising:
    a female connector of a substantially rigid material having a predetermined coefficient of expansion,
    a male connector of a relatively deformable material having a coefficient of expansion different from the coefficient of expansion of said female connector and adapted for connection within said female connector to establish a fluid coupling, said male connector having a bore extending therethrough to permit the passage of fluid to said female connector, and
    resilient means disposed in the bore of said male connector exerting a force against the surface of said bore to urge said male connector to expand outwardly to remain engaged with said female connector in a fluidtight relationship when said female and male connectors tend to separate radially when said fluid coupling is subjected to a temperature change,
    wherein said resilient means is a radially precompressed helicoidal spring disposed in the bore of said male connector, the outer peripheral surface of said spring engaging the surface of said bore to urge the outer periphery of said male connector into engagement with said female connector.

2. The temperature compensated fluid coupling of claim 1, wherein said female connector is of a metallic material and said male connector is of a plastic material.

3. The temperature compensated fluid coupling of claim 1, wherein said helicoidal spring is at least partly imbedded in the surface of the bore of said male connector.

4. The temperature compensated fluid coupling of claim 1, wherein said female connector has a threaded bore extending therethrough for receiving said male connector, said male connector having a threaded outer periphery which is received by the threaded bore of said female connector and threaded therein to create a fluidtight engagement.

5. The temperature compensated fluid coupling of claim 4, wherein said female connector is of a metallic material, and said male connector is of a plastic material.

6. A male connector plug comprising:
    a body made of plastic material, said body being of a generally cylindrical shape and having a longitudinal bore extending therethrough and open at opposite ends of said body, and
    a radially precompressed helicoidal spring disposed in said longitudinal bore, said spring peripherally engaging the inner surface of said longitudinal bore and exerting a radially outwardly directed force thereagainst and tending to urge said surface outwardly thereby tending to urge outwardly the outer periphery of said body.

7. The male connector plug of claim 6, wherein said helicoidal spring is at least partly imbedded in said longitudinal bore.